United States Patent
Uchiyama

(10) Patent No.: US 7,307,622 B2
(45) Date of Patent: Dec. 11, 2007

(54) COORDINATE DETECTION DEVICE WITH IMPROVED OPERABILITY AND METHOD OF DETECTING COORDINATES

(75) Inventor: Takuya Uchiyama, Shinagawa (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 399 days.

(21) Appl. No.: 09/748,178

(22) Filed: Dec. 27, 2000

(65) Prior Publication Data

US 2001/0017617 A1   Aug. 30, 2001

(30) Foreign Application Priority Data

Feb. 17, 2000  (JP) ............................. 2000-040117

(51) Int. Cl.
    G09G 5/00 (2006.01)
(52) U.S. Cl. ................ 345/173; 345/157; 345/162; 178/18.01; 178/18.05; 382/185; 382/189
(58) Field of Classification Search ........ 345/156–157, 345/162, 173–179; 178/18.07–18.09, 19.02–19.05; 382/185–189; 463/37–38
See application file for complete search history.

(56) References Cited

U.S. PATENT DOCUMENTS

| 4,914,624 | A | * | 4/1990 | Dunthorn | 345/173 |
| 5,406,307 | A | * | 4/1995 | Hirayama et al. | 345/800 |
| 5,561,447 | A | * | 10/1996 | Suzuki et al. | 345/179 |
| 5,732,154 | A | * | 3/1998 | Dai | 382/197 |
| 5,745,599 | A | * | 4/1998 | Uchiyama et al. | 382/217 |
| 5,777,605 | A | * | 7/1998 | Yoshinobu et al. | 345/173 |
| 5,790,105 | A | * | 8/1998 | Yoshikawa | 345/173 |
| 5,790,114 | A | * | 8/1998 | Geaghan et al. | 345/763 |
| 5,943,043 | A | * | 8/1999 | Furuhata et al. | 345/173 |
| 6,034,672 | A | * | 3/2000 | Gaultier et al. | 345/173 |
| 6,037,930 | A | * | 3/2000 | Wolfe et al. | 345/174 |
| 6,069,618 | A | * | 5/2000 | Ogo | 345/173 |
| 6,088,023 | A | * | 7/2000 | Louis et al. | 345/173 |
| 6,107,992 | A | * | 8/2000 | Ishigaki | 345/158 |
| 6,121,960 | A | * | 9/2000 | Carroll et al. | 345/173 |
| 6,229,529 | B1 | * | 5/2001 | Yano et al. | 345/175 |
| 6,278,443 | B1 | * | 8/2001 | Amro et al. | 345/173 |
| 6,340,967 | B1 | * | 1/2002 | Maxted | 345/179 |
| 6,369,807 | B1 | * | 4/2002 | Nakashima | 345/179 |
| 6,380,929 | B1 | * | 4/2002 | Platt | 345/173 |
| 6,556,712 | B1 | * | 4/2003 | Loudon et al. | 382/187 |
| 6,560,359 | B2 | * | 5/2003 | Yoshii | 382/173 |

FOREIGN PATENT DOCUMENTS

| JP | 02-288913 | * 11/1990 |
| JP | 09-258901 | * 10/1997 |

* cited by examiner

*Primary Examiner*—Lun-Yi Lao
(74) *Attorney, Agent, or Firm*—Staas & Halsey LLP

(57) ABSTRACT

A coordinate detection device is provided, which device includes an input unit which has a surface thereof to which a coordinate value is input by an input means, a calculation unit which calculates a difference between previous and current coordinate values input by the input unit, and a setting unit which sets, in the calculation unit, a coordinate value input last before the input means is detached from the surface of said input unit as the previous coordinate value to a coordinate value input first after the input means is detached from the surface of the input unit.

40 Claims, 12 Drawing Sheets

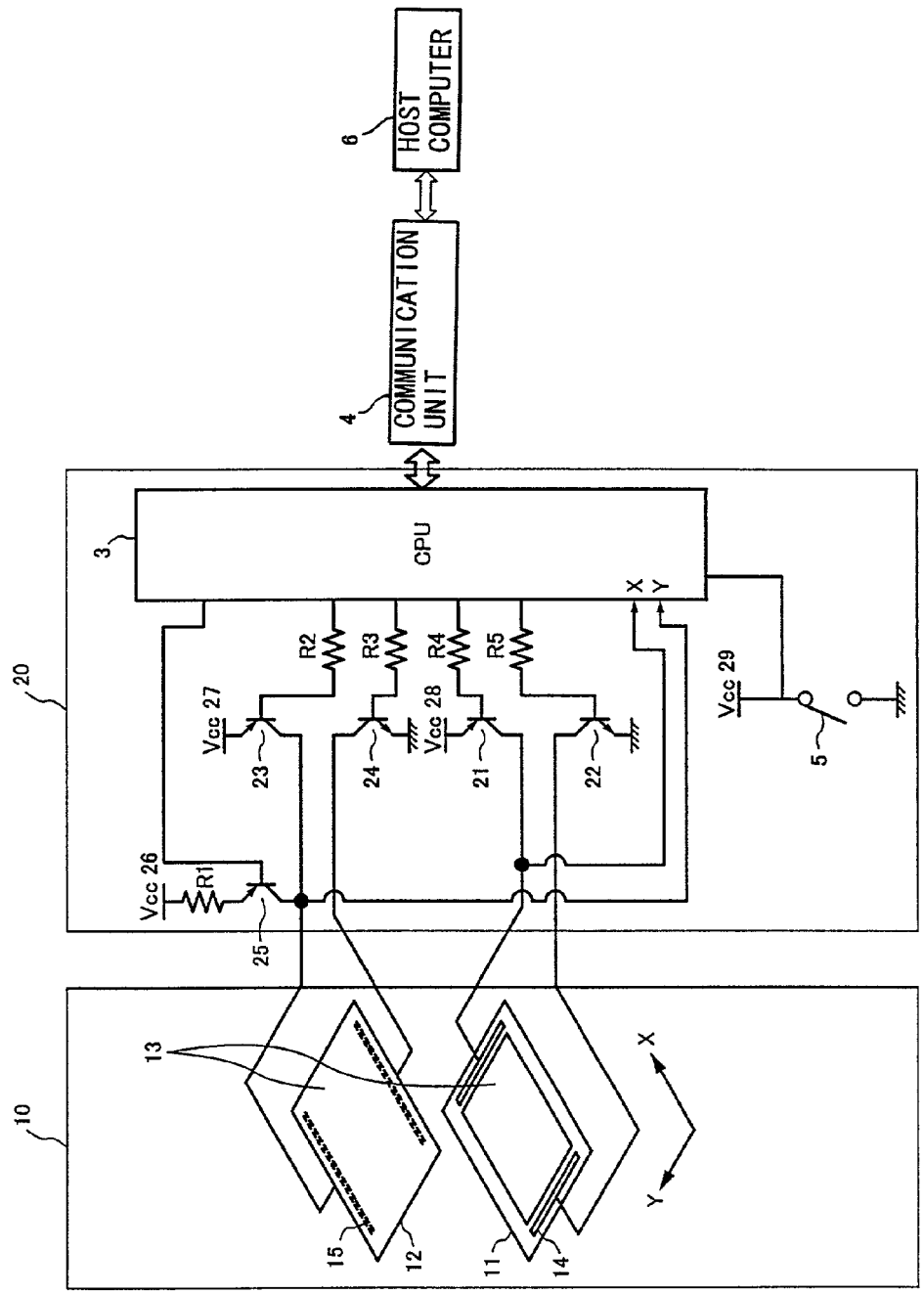

COORDINATE DETECTION DEVICE WITH IMPROVED OPERABILITY AND METHOD OF DETECTING COORDINATES

BACKGROUND OF THE INVENTION

1. Field of the Invention

The present invention generally relates to coordinate detection devices and methods of detecting coordinates, and more particularly to a coordinate detection device employing a coordinate input panel of a resistive film type and a method of detecting coordinates with such a coordinate detection device.

2. Description of the Related Art

Recently, as a personal computer has become smaller and thinner in size, a coordinate input panel has been employed for input operations. The coordinate input panel occupies less space than a mouse not only physically, but also operationally because the operation area of the coordinate input panel is limited to the surface thereof. Moreover, the coordinate input panel can be easily utilized as a pointing device for a personal computer. Therefore, the coordinate input panel has frequently replaced the mouse as a coordinate input device.

Among the coordinate input panels, that of a resistive film type is more frequently used. In the case of the coordinate input panel of the resistive film type, input operations can be performed by a pen. Therefore, the coordinate input panel of the resistive film type can be used as a device for inputting a signature or drawing a picture.

A conventional coordinate detection device employing the coordinate input panel includes two operation modes: an absolute coordinate value mode which outputs the coordinate value of an input point on the coordinate input panel one-to-one on a screen, and a relative coordinate value mode which outputs, as a movement, a difference between the respective coordinate values detected at previous and current sampling timings (hereinafter referred to as previous and current coordinate values, respectively). The switching of these modes is controlled by a device driver (software) or a controller (hardware).

FIG. 1 is a flowchart of a conventional coordinate detection process, in which the coordinate input panel is employed to detect a coordinate value.

In step S10, it is determined whether an input operation has been performed on the coordinate input panel to switch the coordinate input panel "ON". If the result of step S10 is "NO", that is, if the coordinate input panel has not been switched "ON", the process goes to step S11. In step S11, a previous coordinate value is cleared. Thereafter, the process returns to step S10 to determine whether the coordinate input panel has been switched "ON". If the result of step S10 is "YES", that is, if the coordinate input panel has been switched "ON", the process goes to step S12. In step S12, the voltage of an input point on the coordinate input panel is detected to detect the coordinate value of the input point. In step S13, it is determined whether the voltage of the input point is detected a predetermined number of times in step S12. If the result of step S13 is "YES", that is, if the voltage is detected the predetermined number of times, the process goes to step S14. In step S14, the average of the values of the voltage detected the predetermined number of times is calculated. In step S15, the average value calculated in step S14 is defined as a current coordinate value.

Through steps S10 through S15, the coordinate value of the input point on the coordinate input panel is detected as the current coordinate value. As described above, a correct coordinate value can be obtained by detecting the voltage the predetermined number of times to prevent the coordinate value of an input point formed by an improper input operation from being detected.

Next, in step S16, it is determined whether the mode of the coordinate input panel is the relative coordinate value mode. A process performed in step S16 is switched by a device driver or controller. If the result of step S16 is "NO", the mode of the coordinate input panel is the absolute coordinate value mode, and the process goes to steps S22 and S23, which comply with the absolute coordinate value mode. In step S22, the current coordinate value is converted into a current absolute coordinate value. In step S23, data for the current absolute coordinate value obtained in step S22 is output.

On the other hand, if the result of step S16 is "YES", that is, if the mode of the coordinate input panel is the relative coordinate value mode, a process complying with the relative coordinate value mode is performed. First, in step S17, it is determined whether the previous coordinate value is stored. If the result of step S17 is "NO", that is, if the previous coordinate value is cleared, the process goes to step S18. In step S18, the current coordinate value is converted into the previous coordinate value. Then, the process returns to step S10 to repeat the process thereafter, thereby detecting a coordinate value of the next sampling timing (hereinafter referred to a next coordinate value). If the result of step S17 is "YES", that is, if the previous coordinate value is stored, a relative coordinate value is obtained based on the previous coordinate value. In step S19, a difference between the previous and current coordinate values is obtained, and this difference is output to a control circuit to obtain the current relative coordinate value. In step S20, the current coordinate value is converted into the previous coordinate value to obtain the next coordinate value. In step S21, the difference between the previous and current coordinate values, which difference is obtained in step S19 to obtain the current relative coordinate value, is output.

As described above, the coordinate detection process is performed to comply with either the relative or absolute coordinate value mode by switching the operation modes based on the determination of whether the operation mode is set in the relative coordinate value mode.

FIGS. 2A and 2B are diagrams illustrating a conventional input operation.

Suppose that an operator inputs a Japanese hiragana letter "あ" to a coordinate input panel in the relative coordinate value mode, using an operator's finger or a pen.

FIG. 2A shows a series of operations (strokes) to input the letter to the coordinate input panel. The operator inputs a series of strokes (a) through (c) in this order in directions indicated by respective arrows in FIG. 2A on the surface of the coordinate input panel. However, since the conventional coordinate input panel is basically set in the relative coordinate value mode, the strokes (a) through (c) are not expressed as in FIG. 2A, but are sequentially expressed as in FIG. 2B. The input points of the stroke (a), for which no previous coordinate value exists, are converted into coordinates and expressed as the input points are formed on the surface of the coordinate input panel. However, since the coordinate input panel is set in the relative coordinate value mode, the last input point of the stroke (a) and the initial input point of the stroke (b) are expressed as the same coordinate value, and the last input point of the stroke (b) and the initial input point of the stroke (c) are expressed as the same coordinate value. That is, since the coordinate value of an input point is detected based on a difference between the previous and current coordinate values in the relative coordinate value mode, the previous coordinate value becomes identical to the current coordinate value when the coordinate input panel is pressed separately at the respective previous and current input or sampling timings. Thus, the coordinate values of the respective strokes are output in sequence. The coordinate values should be detected in the absolute coordinate value mode to obtain the same output as shown in FIG. 2A.

Therefore, in the case of detecting the coordinate values of a series of operations, once the relative coordinate value mode is set with respect to the operations, it is impossible to switch the relative coordinate value mode to the absolute coordinate value mode, causing the input operations on the coordinate input panel not to correspond to outputs on a display.

As described above, a device driver or controller is employed to set the relative and absolute coordinate value modes for a series of operations. Therefore, if the operator wishes to detect a coordinate value in a desired mode other than a set mode, the set mode cannot be switched to the desired mode during the series of operations.

Further, the coordinate value of an input point on the conventional coordinate input panel is output one-to-one on a screen in the absolute coordinate value mode. Therefore, if input points on the coordinate input panel do not correspond to display positions on the screen, it is difficult to display the coordinate value of an input point on the coordinate input panel in a corresponding position on the screen.

SUMMARY OF THE INVENTION

It is a general object of the present invention to provide a coordinate detection device and a method of detecting coordinates in which the above-described disadvantages are eliminated.

A more specific object of the present invention is to provide a coordinate detection device which has improved operability to facilitate an input operation on a coordinate input panel, and a method of detecting coordinates with such a coordinate detection device.

The above objects of the present invention are achieved by a coordinate detection device including an input unit which has a surface thereof to which a coordinate value is input by an input means, a calculation unit which calculates a difference between previous and current coordinate values input by the input unit, and a setting unit which sets, in the calculation unit, a coordinate value input last before the input means is detached from the surface of said input unit as the previous coordinate value to a coordinate value input first after the input means is detached from the surface of the input unit.

According to the above-described coordinate detection device, by detecting the current coordinate value based on the difference between the previous and current coordinate values, coordinate values as input to the input unit can be detected.

The above-objects of the present invention are also achieved by a method of detecting coordinates including the steps of (a) inputting a coordinate value to a surface of an input unit by an input means, (b) calculating a difference between previous and current coordinate values input by the step (a), and (c) setting, in the step (b), a coordinate value input last before the input means is detached from the surface of the input unit as the previous coordinate value to a coordinate value input first after the input means is detached from the surface of the input unit.

According to the above-described method of detecting coordinates, by detecting the current coordinate value based on the difference between the previous and current coordinate values, coordinate values as input to the input unit can be detected.

BRIEF DESCRIPTION OF THE DRAWINGS

Other objects, features and advantages of the present invention will become more apparent from the following detailed description when read in conjunction with the accompanying drawings, in which:

FIG. 3 is a block diagram of a coordinate detection device according to an embodiment of the present invention;

DETAILED DESCRIPTION OF THE PREFERRED EMBODIMENTS

Figure 1:
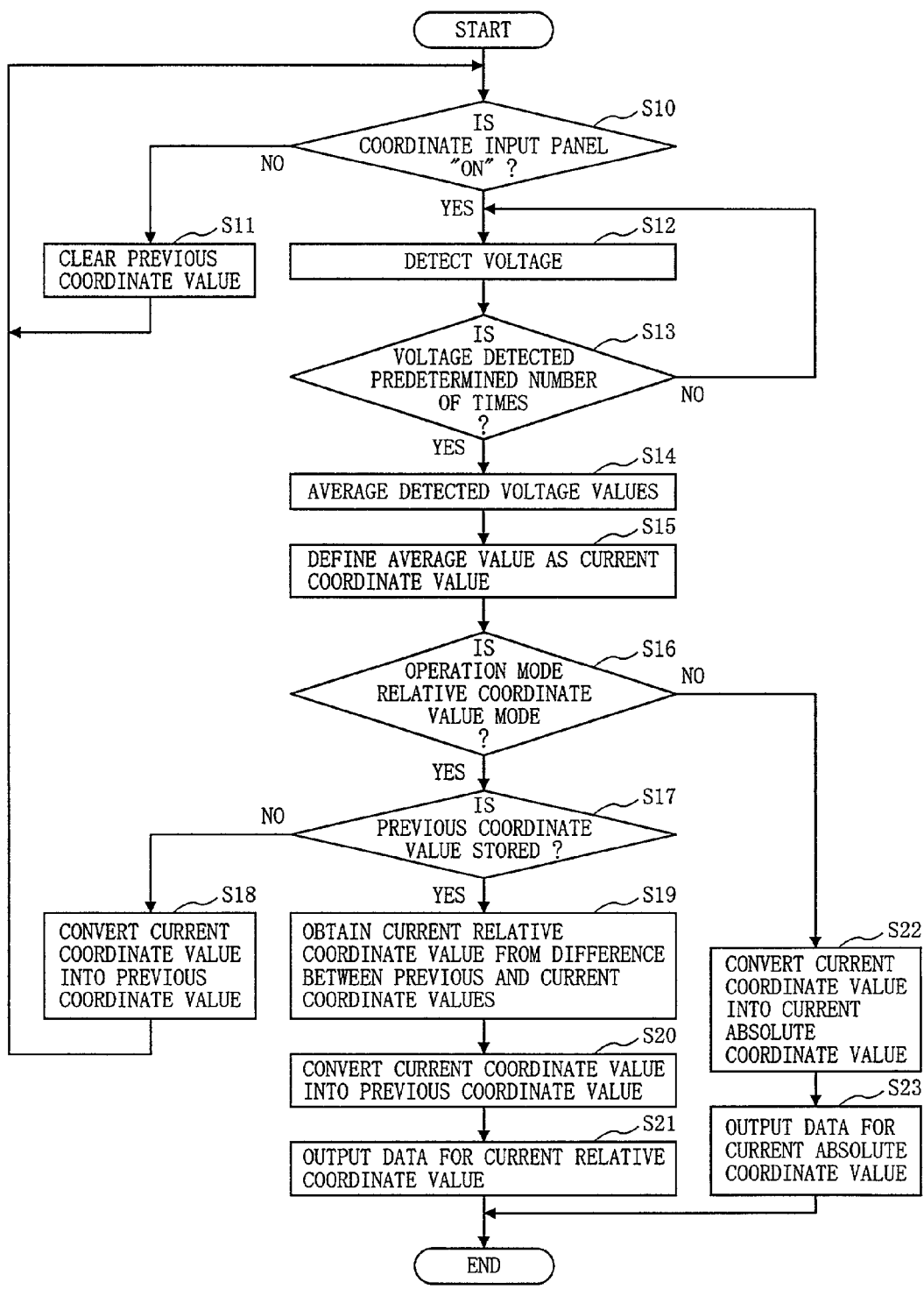
FIG. 1 is a flowchart of a conventional coordinate detection process.
Figure 2A:
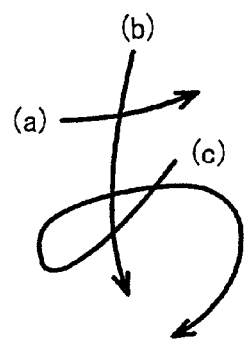
FIGS. 2A and 2B are diagrams illustrating a conventional input operation.
Figure 2B:
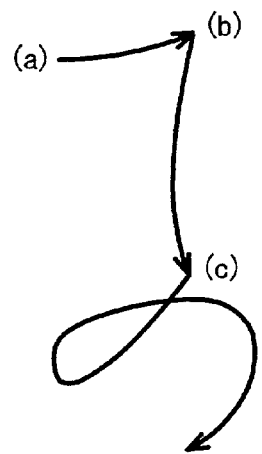

A description will now be given, with reference to the accompanying drawings, of embodiments of the present invention.

A description will first be given of an embodiment of a coordinate detection device according to the present invention.

FIG. 3 is a block diagram of a coordinate detection device according to the embodiment.

According to FIG. 3, the coordinate detection device includes a coordinate input panel 10 and a detection unit 20. A coordinate value detected in the coordinate detection device is transmitted to a host computer 6 via a communication unit 4.

The coordinate input panel 10 includes resistive films 11 and 12 opposing each other with a space therebetween. A coordinate value is detected by an operator pressing the resistive films 11 and 12. The resistive film 11 has a pair of electrodes 14 formed on its peripheral portion to oppose each other with an input area 13 formed therebetween. The resistive film 12 has a pair of electrodes 15 formed on its peripheral portion to oppose each other with an input area 13 formed therebetween. Voltages are applied from the detection unit 20 to the respective pairs of the electrodes 14 and 15, and the resistive films 11 and 12 are arranged so that the applied voltages cross each other at right angles. A coordinate value of a pressed (input) point on the input area 13 of the coordinate input panel 10 is detected by means of these voltages. For example, the electrodes 14, to which the voltage is applied in parallel with an x-axis, detect an x-coordinate, and the electrodes 15, to which the voltage is applied in parallel with a y-axis, detect a y-coordinate.

The detection unit 20 includes transistors 21 through 25, supply voltage terminals 26 through 29, resistances R1 through R5, a switch 5, and a CPU (central processing unit) 3. The detection unit 20 applies the voltages alternately to the electrodes 14 and 15 formed on the respective resistive films 11 and 12 of the coordinate input panel 10 so as to detect input coordinate values. The voltage from the supply voltage terminal 27 is applied to the electrodes 15 via the transistors 23 and 24 of the detection unit 20, and the voltage from the supply voltage terminal 28 is applied to the electrodes 14 via the transistors 21 and 22. The voltages are applied to the respective electrodes 14 and 15 by alternately switching "ON" a pair of the transistors 23 and 24 and a pair of the transistors 21 and 22.

The resistances R2 through R5 are connected to the transistors 23, 24, 21, and 22, respectively, so as to control the voltages applied to the resistive films 11 and 12. The transistor 25 is employed to detect an operator's input operation to the coordinate input panel 10 by means of the voltage supplied from the supply voltage terminal 26 and controlled by the resistance R1. When the operator performs an input operation on the coordinate input panel 10, the voltage detected by the resistive film 12 is transmitted first to the CPU 3, and then the voltage detected by the resistive film 11 is transmitted to the CPU 3. The CPU 3 detects the x-coordinate from the voltage from the resistive film 11 and the y-coordinate from the voltage from the resistive film 12.

The CPU 3 controls the detection of the coordinate value of an input point on the coordinate input panel 10. According to the coordinate input panel 10 having the above-described structure, when a point on the input area 13 is pressed, the resistive films 11 and 12 contact each other at the point. When the voltage is applied to the electrodes 15 of the resistive film 12, the voltage is divided at the contact point so that the voltage representing the y-coordinate is output. Further, when the voltage is applied to the electrodes 14 of the resistive film 11, the voltage is divided at the contact point so that the voltage representing the x-coordinate is output.

The switch 5 switches between the absolute and relative coordinate value modes of the coordinate input panel 10 by a voltage supplied from the supply voltage terminal 29. The CPU 3 detects a coordinate value according to either mode selected by the switching operation of the switch 5.

Figure 4A:
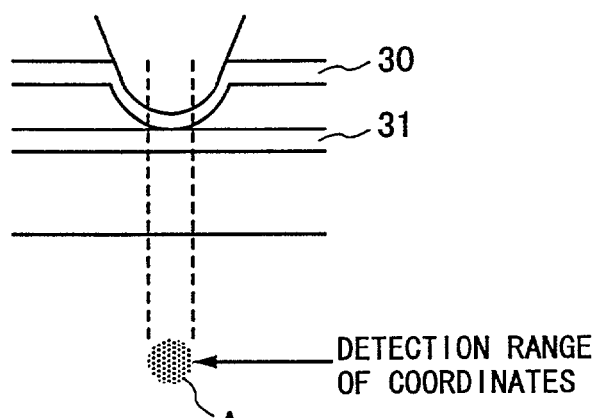
FIGS. 4A and 4B are diagrams illustrating an embodiment of a coordinate detection according to the present invention.
Figure 4B:
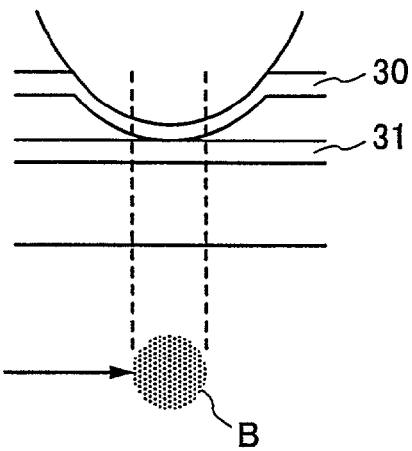

FIGS. 4A and 4B are diagrams illustrating an embodiment of a coordinate detection according to the present invention.

Each of FIGS. 4A and 4B shows a cross-section of a coordinate input panel according to the present invention in a state where the operator performs an input operation thereon. Dotted areas shown in respective FIGS. 4A and 4B are contact areas A and B each formed by contacting an input means, such as a pen or a finger of the operator, with the surface of the coordinate input panel when the input operation is performed. Each of the contact areas A and B is a detection range of coordinates, which range varies depending on a type of the input means. FIG. 4A shows a case in which an input point is formed by means of a pen. The contact area A shows the detection range of the coordinate value of the input point. According to FIG. 4A, the surface of the coordinate input panel including resistive films 30 and 31 is pressed with the point of the pen so that a pressed portion of the resistive film 30 contacts the resistive film 31. The contact portion is detected as coordinates. In this case, the contact area A is processed as a coordinate value.

On the other hand, FIG. 4B shows a case in which an input point is formed by means of a finger of the operator. The contact area B shows the detection range of the coordinate value of the input point. In this case, as in the above-described case, a finger-pressed portion of the resistive film 30 contacts the resistive film 31 to form the contact area B. The contact area B is processed as a coordinate value. Compared with the contact area A, the contact area B has a wider detection area of coordinates so as to cause larger variations in detected coordinate values.

As an input means, a pen is more often employed to input a signature or to draw a picture, while a finger is more often employed to move a pointer. Therefore, in the case of a smaller contact area, the operation mode of the coordinate detection device is set to comply with an input operation by means of a pen, and in the case of a larger contact area, the operation mode of the coordinate detection device is set to comply with an input operation by means of a finger. For example, the operation mode of the coordinate input device is set in the absolute coordinate value mode in the case of a smaller contact area, and in the relative coordinate value mode in the case of a larger contact area. Thus, the operation mode of the coordinate detection device is determined based on a contact area formed by an input operation so as to comply with the input operation. Therefore, the coordinate detection device, by switching the operation modes thereof, can be used as a device for inputting a signature or drawing a picture when the operator performs an input operation by means of a pen, and as a pointing device when the operator performs an input operation by means of an operator's finger.

Figure 5:
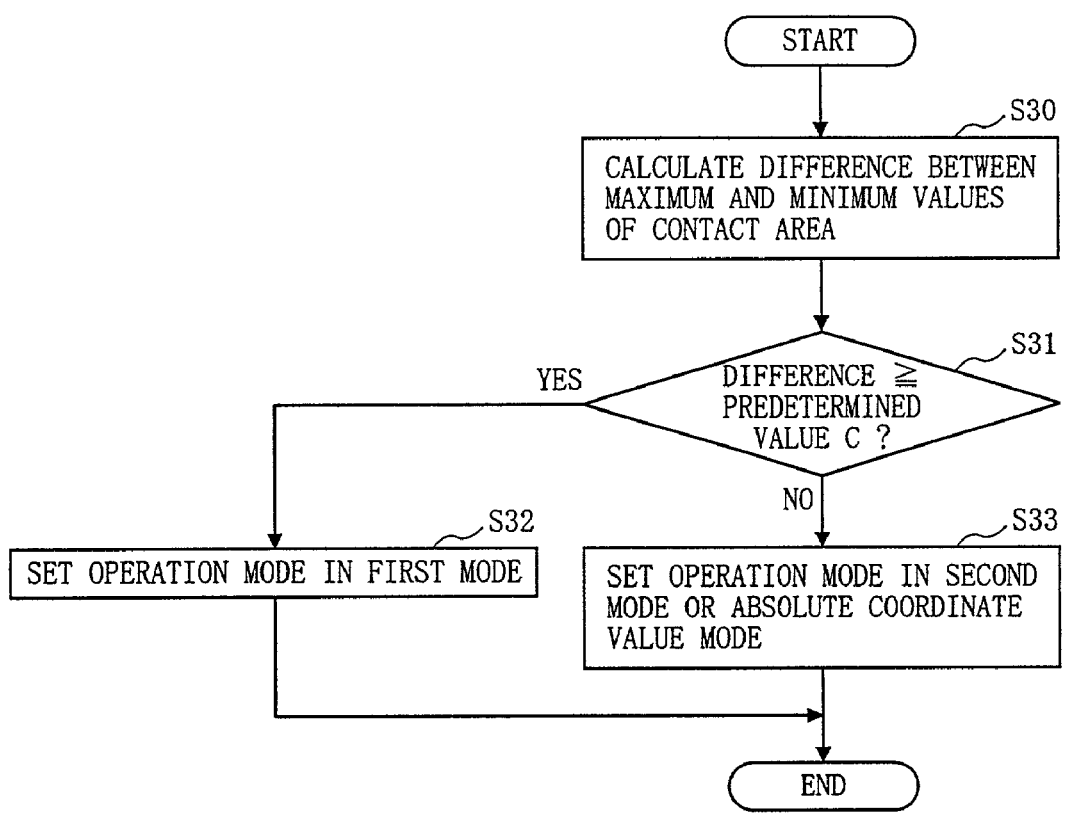
FIG. 5 is a flowchart of a process of a first-type mode determination based on a contact area formed by an input operation.

FIG. 5 is a flowchart of a process of a first-type mode determination based on a contact area formed by an input operation, in which area an input means such as a pen or a finger contacts the surface of a coordinate input panel according to the present invention.

In step S30, a difference between the maximum and minimum values of the contact area is calculated. Next, in step S31, it is determined whether the difference calculated in step S30 is equal to or larger than a predetermined value C. If the result of step S31 is "YES", that is, if the difference is equal to or larger than the predetermined value C, the process goes to step S32, in which the operation mode of the coordinate detection device is set in a first mode. The first mode is an operation mode performing the conventional coordinate detection process which switches between the absolute and relative coordinate value modes. If the result of step S31 is "NO", that is, if the difference is smaller than the predetermined value C, the process goes to step S33, in which the operation mode is set in either a second mode or the absolute coordinate value mode. The second mode is an operation mode in a coordinate detection process according to the present invention.

As described above, the first-type mode determination determines and sets the operation mode appropriate for an input operation based on the contact area formed on the surface of the coordinate input panel by the input operation, using the predetermined value C as reference for the switching of the operation modes.

By using the above-described first-type mode determination, the operation modes of the coordinate detection device can be switched in accordance with operations of the operator such as a signature input, a picture drawing, and a pointer operation.

A description will now be given of a first embodiment of the coordinate detection process according to the present invention.

Figure 6:
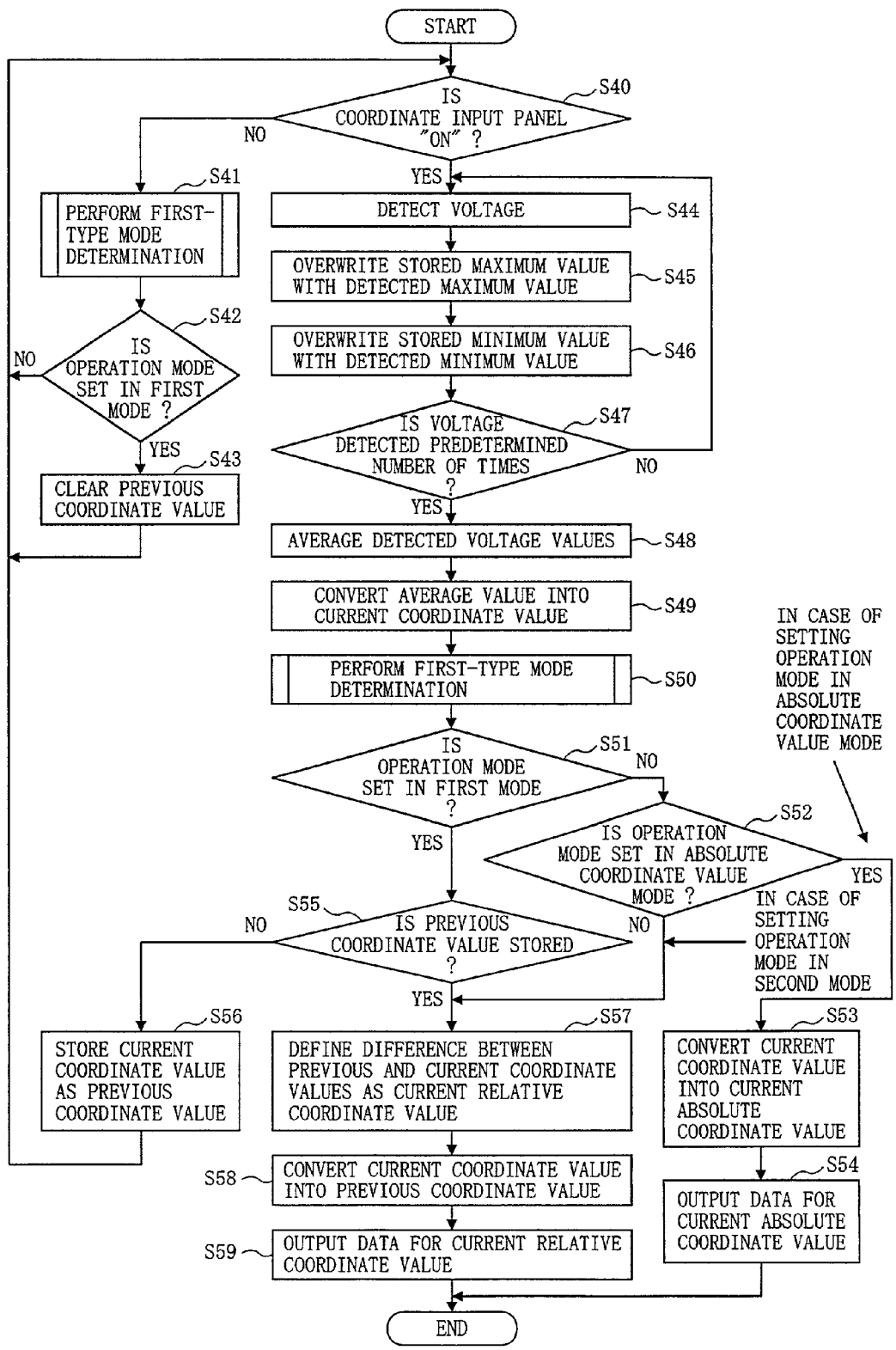
FIG. 6 is a flowchart of a coordinate detection process according to an embodiment of the present invention.

FIG. 6 is a flowchart of a coordinate detection process according to the first embodiment.

According to FIG. 6, the above-described first-type mode determination is performed first to switch the operation mode of the coordinate detection device to a mode complying with an input operation. In step S40, it is determined whether an input operation has been performed on the coordinate input panel. If the result of step S40 is "NO", that is, if the input operation has not been performed on the coordinate input panel, the process goes to step S41, in which the process of the first-type mode determination is performed. In step S41, one of the first mode and the second mode or the absolute coordinate value mode is set based on a difference between the maximum and minimum values of a contact area formed on the surface of the coordinate input panel by the input operation. After one of the above-described modes is set, in step S42, it is determined whether the set mode is the first mode. If the result of step S42 is "YES", that is, if the difference is equal to or larger than the predetermined value C, the next input operation is performed in the same operation mode as the conventional one. Thereafter, in step S43, a previous coordinate value is cleared, and the process returns to step S40. If the result of step S42 is "NO", that is, if the difference is smaller than the predetermined value C, the process returns to step S40.

In steps S41 through S43, the operation mode is determined based on the input operation. If the operation mode is determined to be the first mode, which is the same mode as employed in the conventional coordinate detection process, the previous coordinate value is cleared. If the operation mode is determined to be the second mode or the absolute coordinate value mode, the previous coordinate value is not cleared and is employed to detect the next coordinate value.

If the result of step S40 is "YES", that is, if the input operation has been performed on the coordinate input panel, the process goes to step S44, in which the voltage of an input point on the surface of the coordinate input panel is detected. Thereafter, steps S45 and S46 are performed. Steps S44 through S46 are performed a predetermined number of times. In step S45, the maximum value of the voltage is detected to overwrite a stored maximum value, and in step S46, the minimum value of the voltage is detected to overwrite a stored minimum value. Steps S45 and S46 are processes which are added when the process of the first-type mode determination is performed in the coordinate detection process.

After the above-described steps, in step S47, it is determined whether steps S44 through S46 are performed the predetermined number of times. If the result of step S47 is "NO", that is, if the voltage is not detected the predetermined number of times, steps S44 through S47 are repeated until the result of step S47 becomes "YES".

By thus detecting the voltage of the input point on the surface of the coordinate input panel the predetermined number of times, a coordinate value of an input point formed by an improper input operation is prevented from being detected so that a correct coordinate value can be obtained.

If the result of step S47 is "YES", that is, if the voltage is detected the predetermined number of times, the process goes to step S48, in which the average of the detected values of the voltage is calculated. In step S49, the calculated average is converted into a current coordinate value. In step S50, the process of the first-type mode determination is again performed based on the current coordinate value obtained in step S49.

In step S51, it is determined whether the operation mode of the coordinate input panel is set in the first mode which performs the same coordinate detection process as the conventional one.

If the result of step S51 is "YES", that is, if the operation mode is the first mode, in step S55, it is determined whether the previous coordinate value is stored. If the result of step S55 is "NO", that is, the previous coordinate value is not stored, in step S56, the current coordinate value is stored as the previous coordinate value, and the process returns to step S40 and the following steps are repeated. If the previous coordinate value is stored, in step S57, a difference between the previous and current coordinate values is calculated to be defined as a current relative coordinate value. The current coordinate value does not consider a distance between the input points of the previous and current coordinate values. After the current relative coordinate value is obtained in step S57, in step S58, the current coordinate value is converted into the previous coordinate value. In step S59, the current relative coordinate value is output. Through above-described steps S57 through S59, the relative coordinate value is calculated in the relative coordinate value mode and is output.

If the result of step S51 is "NO", that is, if the operation mode is not the first mode, in step S52, it is determined whether the operation mode is the absolute coordinate value mode. If the result of step S52 is "YES", that is, if the operation mode is the absolute value mode, the process goes to steps S53 and S54. In step S53, the current coordinate value obtained in step S49 is converted into a current absolute coordinate value. In step S54, the current absolute coordinate value obtained in step S53 is output. Thus, in steps S53 and S54, the current absolute coordinate value is obtained in the absolute coordinate value mode and is output.

If the result of step S52 is "NO", that is, if the operation mode is not the absolute coordinate value mode, but is the second mode, the current absolute coordinate value is calculated without detecting the previous coordinate value.

In the case of detecting the coordinate value in the second mode, steps S57 through S59 are performed without detecting the previous coordinate value in step S55. In step S57, a difference between the current coordinate value and the stored previous coordinate value is calculated to be defined as a current relative coordinate value. After the current relative coordinate value is obtained, in step S58, the current coordinate value is determined to be the previous coordinate value. In step S59, the current relative coordinate value is output.

Thus, a coordinate value can be detected in a mode appropriate for an input operation by employing the first-type mode determination and a previous coordinate value.

Figure 7:
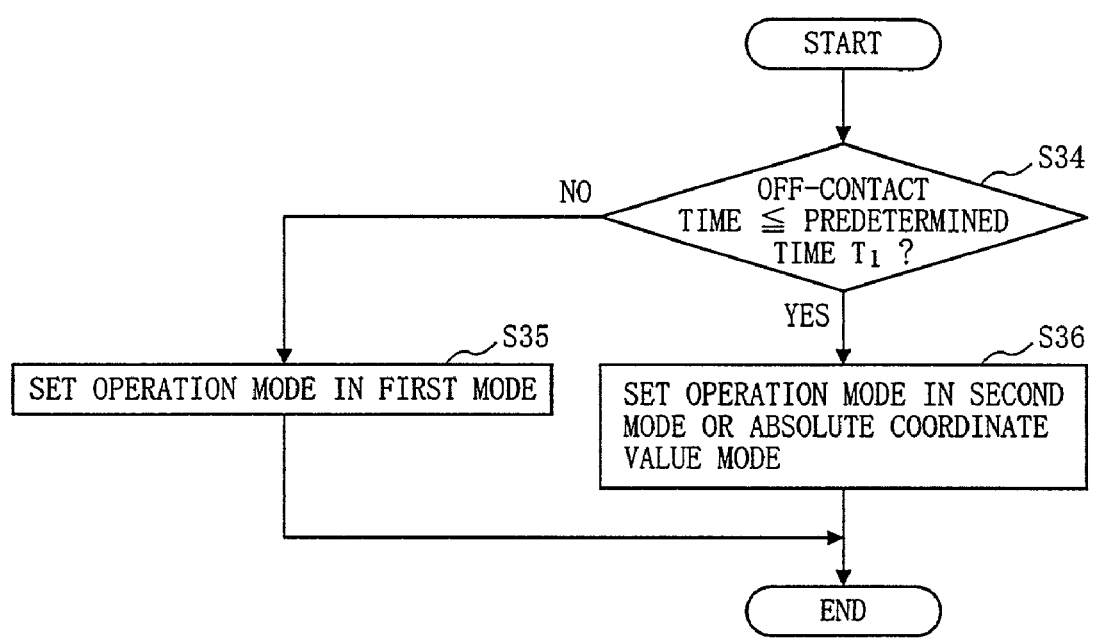
FIG. 7 is a flowchart of a process of a second-type mode determination based on an off-contact time.

FIG. 7 is a flowchart of a process of a second-type mode determination based on an off-contact time.

According to FIG. 7, the operation mode of the coordinate detection device is determined based on the off-contact time during which an input means such as a pen or a finger does not contact the surface of the coordinate input panel. For example, when a pen or a finger is detached from the surface of the coordinate input panel between previous and current input operations during a series of input operations, the off-contact time is often shorter in this case than is required to switch the operations of the coordinate detection device so that the coordinate detection device can be used, for example, as a pointing device. Therefore, the off-contact time is compared with a predetermined time $T_1$ to determine an appropriate mode for the series of operations. In step S34, it is determined whether the off-contact time is equal to or shorter than the predetermined time $T_1$. If the result of step S34 is "NO", that is, the off-contact time is longer than the predetermined time $T_1$, it is determined that the current input operation is performed as an operation of, for example, a pointing device, and the process goes to step S35, in which the first mode is set. If the result of step S34 is "YES", that is, the off-contact time is shorter than or equal to the predetermined time $T_1$, the process goes to step S36, in which the second mode or the absolute coordinate value mode is set.

Thus, the second-type mode determination determines and sets the operation mode appropriate for an input operation based on the off-contact time during which an input means does not contact the surface of the coordinate input panel, using the predetermined time $T_1$ as reference for the switching of the operation modes.

By using the above-described second-type mode determination, the operation modes of the coordinate detection device can be switched in accordance with operations of the operator such as a signature input, a picture drawing, and a pointer operation.

A description will now be given of a second embodiment of the coordinate detection process according to the present invention.

Figure 8:
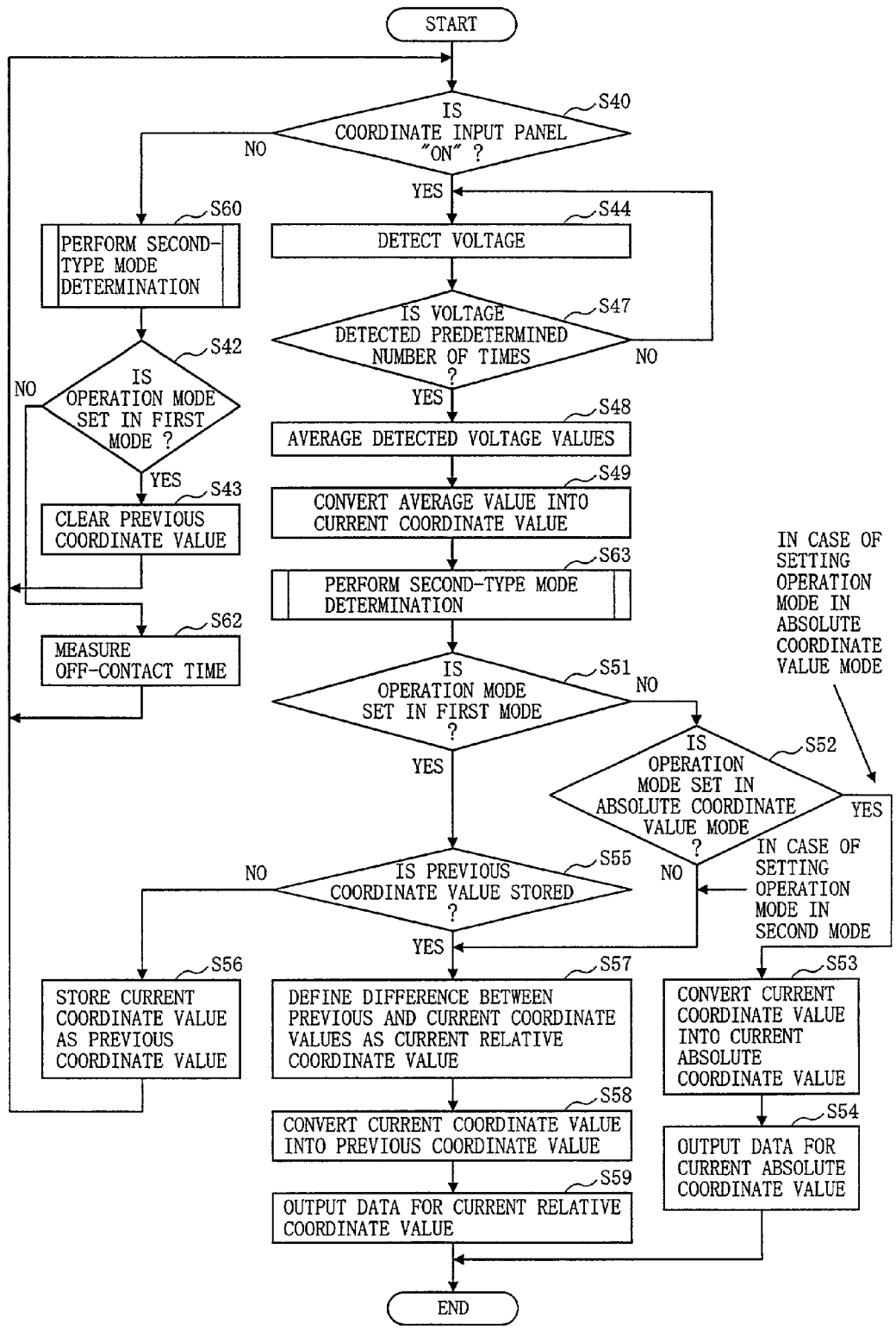
FIG. 8 is a flowchart of a coordinate detection process according to an embodiment of the present invention.

FIG. 8 is a flowchart of a coordinate detection process according to the second embodiment.

The coordinate detection process according to the second embodiment employs the process of the second-type mode determination shown in FIG. 7, which process switches the operation modes of the coordinate detection device in accordance with an input operation. In FIG. 8, the same steps as those in FIG. 6 are referred to by the same numerals, and a description thereof will be omitted.

If it is determined in step S40 that an input operation has not been performed on the coordinate input panel, in step S60, the process of the second-type mode determination is performed to determine whether the operation mode is the first mode, or the second mode or the absolute value mode based on the off-contact time. Thereafter, in step S42, it is determined whether the operation mode is the first mode. If the result of step S42 is "YES", that is, if the off-contact time is longer than the predetermined time $T_1$, the next input operation is performed in the same operation mode as the conventional one. Then, in step S43, a previous coordinate value is cleared, and the process returns to step S40.

If the result of step S42 is "NO", that is, the off-contact time is equal to or shorter than the predetermined time $T_1$, the process goes to step S62. In step S62, the off-contact time, namely, the duration of an off-contact state where a pen or a finger is detached from the surface of the coordinate input panel, is measured. Step S62 is a process which is added when the second-type mode determination is performed in the coordinate detection process.

If it is determined in step S40 that the input operation has been performed on the coordinate input panel, steps S44 and S47 are repeated until the voltage of the input point is detected the predetermined number of times. Thereby, a coordinate value of an input point formed by an improper input operation is prevented from being detected so that a correct coordinate value can be obtained.

In step S48, the average of the detected values of the voltage is calculated. In step S49, the calculated average is converted into a current coordinate value. In step S63, the process of the second-type mode determination is again performed based on the current coordinate value obtained in step S49.

In step S63, the operation mode is switched to one of the above-described modes so as to comply with the input operation. Then, in step S51, it is determined whether the operation mode is set in the first mode which performs the same coordinate detection process as the conventional one.

If the operation mode is the first mode, in step S55, it is determined whether the previous coordinate value is stored. If the previous coordinate value is not stored, in step S56, the current coordinate value is stored as the previous coordinate value, and the process returns to step S40 and the following steps are repeated.

If the previous coordinate value is stored, in step S57, a difference between the previous and current coordinate values is calculated to be defined as a current relative coordinate value. The current coordinate value does not consider a distance between the input points of the previous and current coordinate values. After the current relative coordinate value is obtained in step S57, in step S58, the current coordinate value is converted into the previous coordinate value. In step S59, the current relative coordinate value is output. Through the above-described steps S57 through S59, the relative coordinate value is calculated in the relative coordinate value mode and is output.

If the result of step S51 is "NO", that is, if the operation mode is not the first mode, in step S52, it is determined whether the operation mode is the absolute coordinate value mode. If the operation mode is the absolute value mode, the process goes to steps S53 and S54. In step S53, the current coordinate value obtained in step S49 is converted into a current absolute coordinate value. In step S54, the current absolute coordinate value obtained in step S53 is output. Thus, in steps S53 and S54, the current absolute coordinate value is obtained in the absolute coordinate value mode and is output.

If the result of step S52 is "NO", that is, if the operation mode is not the absolute coordinate value mode, but is the second mode, the coordinate detection process is performed in the relative coordinate value mode. In the case of detecting the coordinate value in the second mode, steps S57 through S59 are performed without detecting and storing the previous coordinate value in step S55. In step S57, a difference between the current coordinate value and the stored previous coordinate value is calculated to be defined as a current relative coordinate value. After the current relative coordinate value is obtained, in step S58, the current coordinate value is determined to be a previous coordinate value. In step S59, the current relative coordinate value is output.

Thus, a coordinate value can be detected in a mode appropriate for an input operation by employing the second-type mode determination and a previous coordinate value.

Figure 9A:
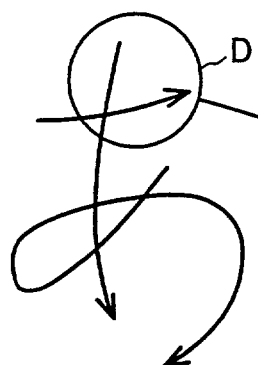
FIGS. 9A and 9B are diagrams illustrating operations on a coordinate input panel according to the present invention.
Figure 9B:
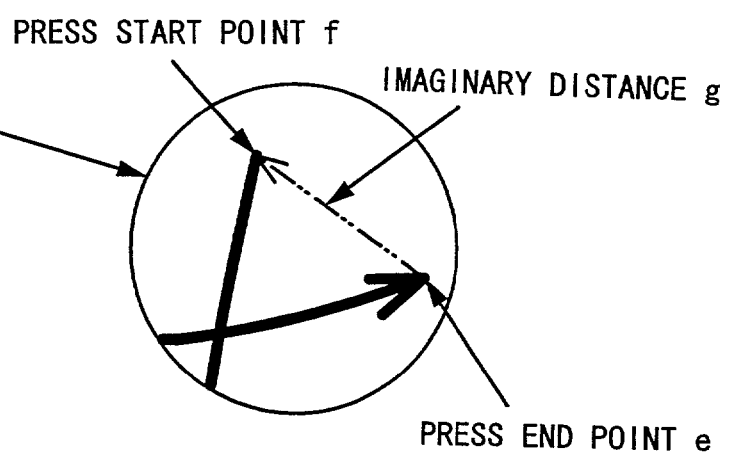

FIGS. 9A and 9B are diagrams illustrating an input operation on the coordinate input panel according to the present invention.

Suppose that the operator inputs a Japanese hiragana letter "あ" to the coordinate input panel, using an operator's finger or a pen.

FIG. 9A shows the letter input by the operator, and FIG. 9B is an enlarged view of a circled portion D of the letter shown in FIG. 9A. A description will be given with reference to the circled portion D. The coordinate values of the circled portion D of the letter are detected in the coordinate detection process according to the present invention. The coordinate values of a press end point e, at which a pen or a finger is detached from the surface of the coordinate input panel after continuously pressing the surface, and a press start point f, at which the pen or the finger starts pressing the surface, are obtained by considering an imaginary distance g therebetween by the coordinate detection process according to the present invention.

Figure 10A:
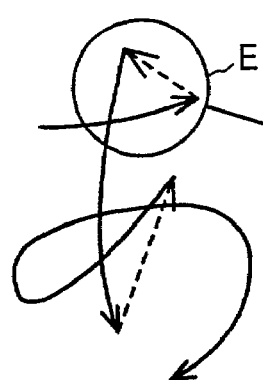
FIGS. 10A and 10B are diagrams illustrating a movement of a cursor according to the present invention.
Figure 10B:
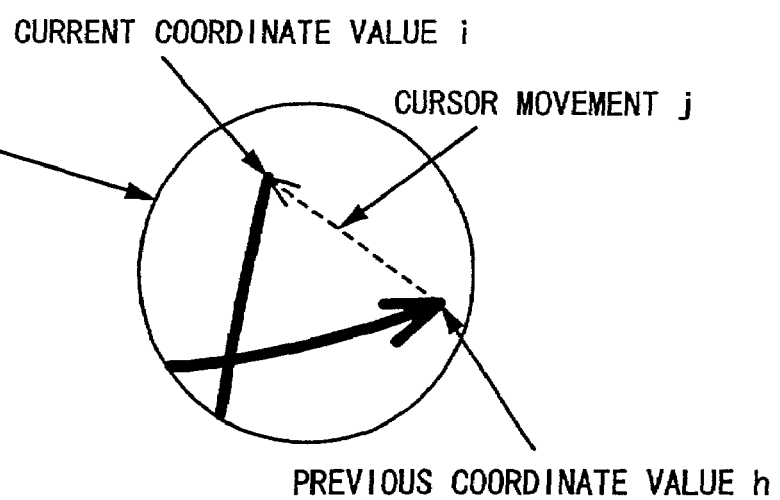

FIGS. 10A and 10B are diagrams illustrating a movement of a cursor according to the present invention.

The input points formed on the surface of the coordinate input panel by the input operation as shown in FIG. 9A are detected according to the coordinate detection process of the present invention, and are output as shown in FIG. 10A. FIG. 10A shows the coordinate values of the input points in an output state. Respective dotted arrows show routes along and directions in which the cursor moves. FIG. 10B is an enlarged view of a circled portion E of the letter, which portion includes one of the movements of the cursor. A description will be given with reference to the circled portion E. The coordinate values of the circled portion E of the letter are detected and output in the coordinate detection process according to the present invention. The points e and f shown in FIG. 9B are output as previous and current coordinate values h and i, respectively, in FIG. 10B. A cursor movement j is made by an imaginary operation performed by the coordinate detection process according to the present invention.

As described above, by switching the operation mode to the second mode in the coordinate detection process, the same coordinate values as those of the input points are detected and output.

Figure 11:
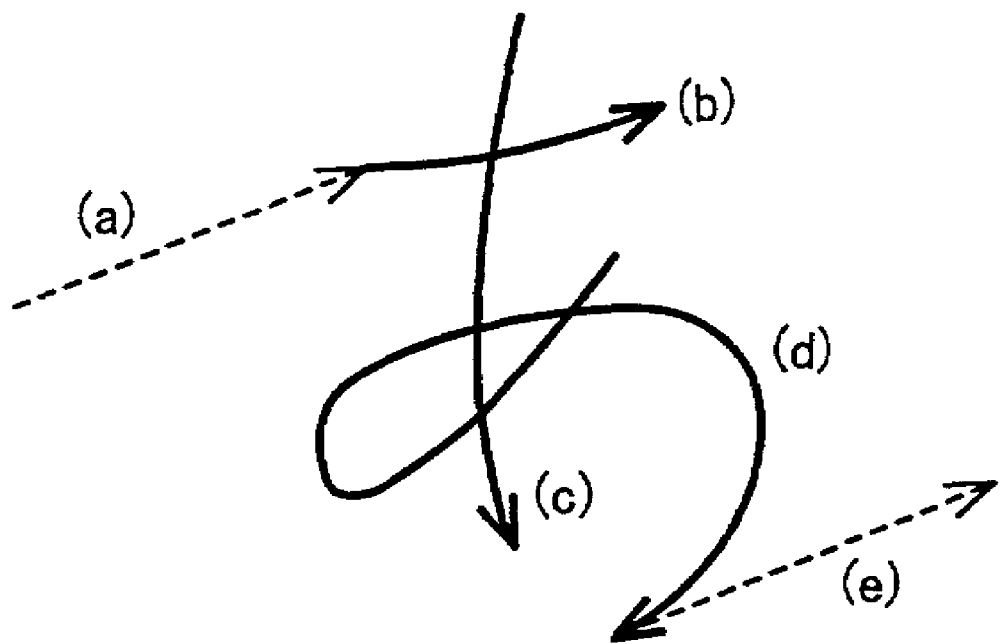
FIG. 11 is a diagram illustrating an input operation according to the present invention.

FIG. 11 is a diagram illustrating an input operation according to the present invention.

FIG. 11 shows a series of operations (strokes) to input a Japanese hiragana letter "あ" to the coordinate input panel. The operator inputs a series of operations (strokes) (a) through (e) in this order in directions indicated by respective arrows in FIG. 11 on the surface of the coordinate input panel. The operations (a) and (e) are the movements of the cursor. The cursor is moved to the initial input point of the stroke (b) by the operation (a). The operation (e) is the movement of the cursor after the letter is input to the coordinate input panel by the strokes (b) through (d). During the operations (strokes) (a) through (e), a pen or a finger is detached from the surface of the coordinate input panel between one operation and the following operation.

Although the input operation according to the present invention is described by taking the Japanese hiragana letter "あ" as an example in FIGS. 9A through 11, the present invention can also be applied to the input operation of an English letter.

Figure 12:
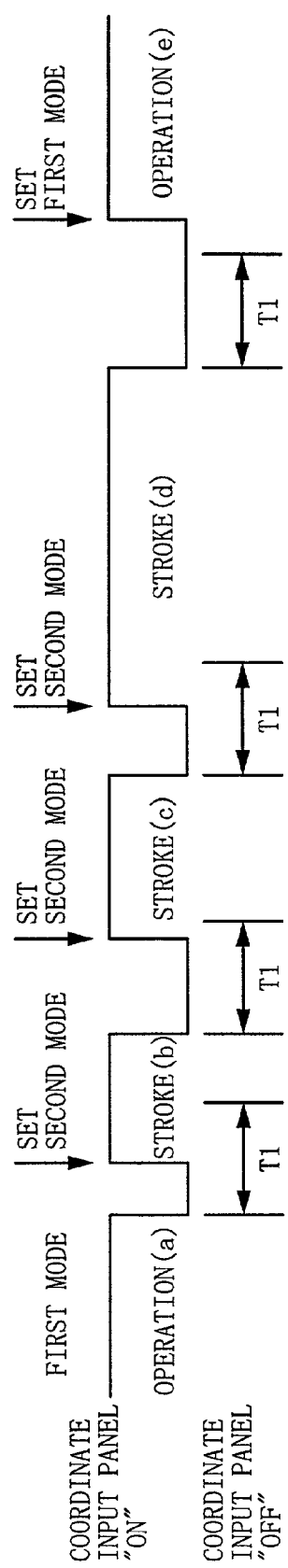
FIG. 12 is a timing chart of a switching of operation modes based on the input operation shown in FIG. 11.

FIG. 12 is a timing chart of the switching of the operation modes based on the input operation shown in FIG. 11. During the operation (a), the pen or the finger contacts the surface of the coordinate input panel in the first mode, which performs the same switching operation as the conventional operation mode. During the switching from the operation (a) to the stroke (b), the coordinate input panel is switched "OFF", or is in an "OFF" state. If the "OFF" state time or the off-contact time of the coordinate input panel is equal to or shorter than the predetermined time $T_1$, the operation mode is switched to the second mode, which is the operation mode of the present invention. Similarly, if the off-contact time during the switching from the stroke (b) to the stroke (c) is equal to or shorter than the predetermined time $T_1$, the operation mode is switched to the second mode. Likewise, if the off-contact time during the switching from the stroke (c) to the stroke (d) is equal to or shorter than the predetermined time $T_1$, the operation mode is switched to the second mode. The off-contact time during the switching from the stroke (d) to the operation (e) is longer than the predetermined time $T_1$. Therefore, the operation mode is switched to the first mode.

By thus switching between the first and second modes based on the comparison between the off-contact time and the predetermined time $T_1$, the operation modes of the coordinate detection device can be switched freely in accordance with the operations of the operator. Further, by automatically switching the switch of the coordinate input panel for switching between the operation modes "OFF" and "ON" to switch the operation mode between the first and second modes, respectively, the cursor can be moved to the initial input point of an operation for inputting a signature or drawing a picture so that the signature can be input or the picture can be drawn from the initial input point.

The present invention is not limited to the specifically disclosed embodiments, and variations and modifications may be made without departing from the scope of the present invention.

The present application is based on Japanese priority application No. 2000-040117 filed on Feb. 17, 2000, the entire contents of which are hereby incorporated by reference.

What is claimed is:

1. A coordinate detection device, comprising:
   an input unit, having a surface thereof, to which a coordinate value is input by an input device; and
   a detection unit that determines an operation mode of said input unit, the detection unit further comprising:
      a calculation unit configured to calculate a distance between a final coordinate value of a previous input operation and a beginning coordinate value of a current input operation by said input unit so that an absolute coordinate value mode inputting operation is enabled in a relative coordinate value mode, the current input operation occurring after a detachment of the input device from the surface of said input unit during the immediately preceding previous input operation;
   wherein a coordinate value at a time when the input device is detached from the surface of said input unit is set as the final coordinate value of the previous input operation, and
   wherein the distance calculated by said calculation unit is transmitted to a host apparatus so as to prevent the current input operation from being connected to the previous input operation on a display, and
   wherein the absolute coordinate value mode inputting operation is enabled in the relative coordinate value mode based on a time during which the input device is detached from the surface of said input unit.

2. The coordinate detection device according to claim 1, wherein the detection unit further comprises a control unit that enables or disables said setting of the coordinate value based on a determination result of said detection unit.

3. The coordinate detection device according to claim 2, wherein said detection unit determines an operation mode of said input unit based on a relative contact area formed by a contact of the input device with the surface of said input unit.

4. A method of detecting coordinates, comprising:
   inputting a coordinate value to a surface of an input unit, by an input device;

determining an operation mode of said inputting;
calculating a distance between a final coordinate value of a previous input operation and a beginning coordinate value of a current input operation by said inputting so that an absolute coordinate value mode inputting operation is enabled in a relative coordinate value mode, the current input operation occurring after a detachment of the input device from the surface of said input unit during the immediately preceding previous input operation; and
setting, in said calculating, a coordinate value input at a time when the input device is detached from the surface of the input unit as the final coordinate value of the previous input operation,
wherein the distance calculated by said calculating is transmitted to a host apparatus so as to prevent the current input operation from being connected to the previous input operation on a display, and
wherein the absolute coordinate value mode inputting operation is enabled in the relative coordinate value mode based on a time during which the input device is detached from the surface of said input unit.

5. The method as claimed in claim 4, further comprising enabling or disabling said setting based on a determination result of said determining.

6. The method as claimed in claim 5, wherein determining determines the operation mode of said inputting based on a relative contact area formed by a contact of the input device with the surface of the input unit.

7. A coordinate detection device, comprising:
an input unit, having a surface thereof, to which a coordinate value is input;
a detection unit determining an operation mode of said input unit, the detection unit further comprising:
a calculation unit configured to calculate a distance between a final coordinate value of a first input operation and a beginning coordinate value of a second input operation so that an absolute coordinate value mode inputting operation is enabled in a relative coordinate value mode,
wherein in said calculation unit, a coordinate value of the first input operation is set as the final coordinate value input of the first input operation,
wherein the distance calculated by said calculation unit is transmitted to a host apparatus so as to prevent the second input operation from being connected to the first input operation on a display,
wherein the absolute coordinate value mode inputting operation is enabled in the relative coordinate value mode based on a time during which the input device is detached from the surface of said input unit.

8. The coordinate detection device according to claim 7, wherein the detection unit further comprises a control unit that enables or disables said setting of the coordinate value based on a determination result of said detection unit.

9. The coordinate detection device according to claim 8, wherein said detection unit determines an operation mode of said input unit as either the absolute coordinate value mode or a relative coordinate value mode based on a relative area of contact area between an input part and the surface of said input unit.

10. A method of detecting coordinates, comprising:
inputting at least one coordinate value to a surface of an input unit using an input device;
determining an operation mode of said inputting;
enabling an absolute coordinate value mode inputting operation in a relative coordinate value mode by setting a coordinate value of a first inputting as the final coordinate value input of the first inputting if a second inputting occurs within a predetermined time after the first inputting; and
calculating a distance between the set coordinate value of the first inputting and an initial coordinate value of the second inputting,
wherein the absolute coordinate value mode inputting operation is enabled in the relative coordinate value mode based on a time during which the input device is detached from the surface of said input unit, and
the distance calculated by said calculating is transmitted to a host apparatus so as to prevent the second inputting from being connected to the first inputting on a display.

11. The method according to claim 10, further comprising enabling or disabling said setting based on a result of said determining.

12. The method according to claim 11, the determining based on a relative area of contact of the inputting.

13. A writing device, comprising:
an input unit, having a surface thereof, to which a coordinate value is input by an input device;
a detection unit determining an operation mode of the input unit, the detection unit further comprising:
a calculation unit configured to calculate a distance between a final coordinate value of a previous operation and a beginning coordinate value of a current input operation by said input unit so that an absolute coordinate value mode inputting operation is enabled in a relative coordinate value mode, the current input operation occurring after a detachment of the input device from the surface of said input unit during the immediately preceding previous input operation,
wherein, in said calculation unit, a coordinate value at a time when the input device is detached is set from the surface of said input unit as the final coordinate value of the previous input operation,
wherein the distance calculated by said calculation unit is transmitted to a host apparatus so as to prevent the current input operation from being connected to the previous input operation on a display,
wherein the absolute coordinate value mode inputting operation is enabled in the relative coordinate value mode based on a time during which the input device is detached from the surface of said input unit.

14. The writing device according to claim 13, further comprising a controller to enable or disable the setting based on a determination result of the detection unit.

15. The writing device according to claim 14, wherein the detection unit determines the operation mode of the input unit based on a relative size of a contact area formed by a contact of the input device with the surface of the input unit.

16. A method of detecting coordinates of a writing character, comprising:
inputting a coordinate value of a writing character to a surface of an input unit, by an input device;
determining an operation mode of the inputting;
calculating a distance between a final coordinate value of a previous input operation and a beginning coordinate value of a current input operation so that an absolute coordinate value mode inputting operation is enabled in a relative coordinate value mode, the current input operation occurring after a detachment of the input device from the surface of said input unit during the immediately preceding previous input operation; and setting, in the calculating, a coordinate value input at a time when the input device is detached from the surface of the input unit as the final coordinate value of the previous input operation, wherein the distance calculated by said calculating is transmitted to a host apparatus so as to prevent the current input operation from being connected to the previous input operation on a display, and wherein the absolute coordinate value mode inputting operation is enabled in the relative coordinate value mode based on a time during which the input device is detached from the surface of said input unit.

17. The method according to claim 16, further comprising enabling or disabling the setting based on the determining.

18. The method according to claim 17, wherein the determining determines the operation mode of the inputting based on a relative size of a contact area formed by a contact of the input device with the surface of the input unit.

19. A writing device, comprising:
an input unit, having a surface thereof, to which a coordinate value of a writing character is input;
a detection unit determining an operation mode of the input unit, the detection unit further comprising:
a calculator configured to calculate a distance between a final coordinate value of a first input operation and a beginning coordinate value of a second input operation so that an absolute coordinate value mode inputting operation is enabled in a relative coordinate value mode,
wherein a coordinate value of the first input operation is set in the processor as the final coordinate value input of the first input operation, and
wherein the distance calculated by said calculator is transmitted to a host apparatus so as to prevent the second input operation from being connected to the first input operation on a display, and
wherein the absolute coordinate value mode inputting operation is enabled in the relative coordinate value mode based on a time during which the input device is detached from the surface of said input unit.

20. The writing device according to claim 19, further comprising a controller enabling or disabling the setting unit based on a determination result of the detection unit.

21. The writing device according to claim 20, wherein the detection unit determines the operation mode of said input unit based on a relative area of contact between an input part and the surface of the input unit.

22. A method of detecting coordinates of a writing character, comprising:
inputting at least one coordinate value of the writing character to a surface of an input unit by an input device;
determining an operation mode of inputting;
setting a coordinate value of a first inputting as the final coordinate value input of the first inputting if a second inputting has not occurred for a predetermined time; and
enabling an absolute coordinate value mode inputting operation in a relative coordinate value mode by calculating a distance between the set coordinate value of the first inputting and an initial coordinate value of the second inputting,
wherein the distance calculated by said calculating is transmitted to a host apparatus so as to prevent the second inputting from being connected to the first inputting on a display, and wherein the absolute coordinate value mode inputting operation is enabled in the relative coordinate value mode based on a time during which the input device is detached from the surface of said input unit.

23. The method according to claim 22, further comprising enabling or disabling the setting based on a result of the determining.

24. The method according to claim 22, the determining based on a relative area of the contact of the inputting.

25. A computer-readable recording medium that stores a method of detecting coordinates comprising:
inputting a coordinate value to a surface of an input unit, by an input device;
determining an operation mode of the inputting;
calculating a distance between a final coordinate value of a previous input operation and a beginning coordinate value of a current input operation so that an absolute coordinate value mode inputting operation is enabled in a relative coordinate value mode, the current input operation occurring after a detachment of the input device from the surface of said input unit during the immediately preceding previous input operation; and
setting, in the calculating, a coordinate value input at a time when the input device is detached from the surface of the input unit as the final coordinate value of the previous input operation,
wherein the distance calculated by said calculating is transmitted to a host apparatus so as to prevent the current input operation from being connected to the previous input operation on a display, and
wherein the absolute coordinate value mode inputting operation is enabled in the relative coordinate value mode based on a time during which the input device is detached from the surface of said input unit.

26. The computer-readable recording medium according to claim 25, the method further comprising:
enabling or disabling said setting based on a determination result of said determining.

27. The computer-readable recording medium according to claim 26, wherein the determining determines the operation mode of said inputting based on a determining of a type of input device by determining a contact area formed by a contact of the input device with the surface of the input unit.

28. A computer-readable recording medium that stores a method of detecting coordinates comprising:
inputting at least one coordinate value to a surface of an input unit using an input device;
enabling an absolute coordinate value mode inputting operation in a relative coordinate value mode by setting a coordinate value of a first inputting as the final coordinate value input of the first inputting if a second inputting occurs within a predetermined time after the first inputting; and
calculating a distance between the set coordinate value of the first inputting and an initial coordinate value of the second inputting,
wherein the absolute coordinate value mode inputting operation is enabled in the relative coordinate value mode based on a time during which the input device is detached from the surface of said input unit, and
the distance calculated by said calculating is transmitted to a host apparatus so as to prevent the second inputting from being connected to the first inputting on a display.

29. The computer-readable recording medium according to claim 28, the method further comprising enabling or disabling said setting based on a result of determining either an absolute coordinate value mode or a relative coordinate value mode.

30. The computer-readable recording medium according to claim 29, the determining as either the absolute coordinate value mode or the relative coordinate value mode based on determining of a type of input device by determining an area of contact of the inputting.

31. A coordinate detection device, comprising:
an input unit, having a surface thereof, to which a coordinate value is input by input means; and
a detection unit that determines an operation mode of said input unit, the detection unit further comprising:
a calculation unit configured to calculate a distance between a final coordinate value of a previous input operation and a beginning coordinate value of a current input operation by said input unit so that an absolute coordinate value mode inputting operation is enabled in a relative coordinate value mode, the current input operation occurring after a detachment of the input means from the surface of said input unit during the immediately preceding previous input operation;
wherein a coordinate value at a time when the input means is detached from the surface of said input unit is set as the final coordinate value of the previous input operation, and
wherein the distance calculated by said calculation unit is transmitted to a host apparatus so as to prevent the current input operation from being connected to the previous input operation on a display, and
wherein the absolute coordinate value mode inputting operation is enabled in the relative coordinate value mode based on a time during which the input means is detached from the surface of said input unit.

32. A method of detecting coordinates, comprising:
inputting a coordinate value to a surface of an input unit, by input means;
determining an operation mode of said inputting;
calculating a distance between a final coordinate value of a previous input operation and a beginning coordinate value of a current input operation by said inputting so that an absolute coordinate value mode inputting operation is enabled in a relative coordinate value mode, the current input operation occurring after a detachment of the input means from the surface of said input unit during the immediately preceding previous input operation; and
setting, in said calculating, a coordinate value input at a time when the input means is detached from the surface of the input unit as the final coordinate value of the previous input operation,
wherein the distance calculated by said calculating is transmitted to a host apparatus so as to prevent the current input operation from being connected to the previous input operation on a display, and
wherein the absolute coordinate value mode inputting operation is enabled in the relative coordinate value mode based on a time during which the input means is detached from the surface of said input unit.

33. A coordinate detection device, comprising:
an input unit, having a surface thereof, to which a coordinate value is input;
a detection unit determining an operation mode of said input unit, the detection unit further comprising:
a calculation unit configured to calculate a distance between a final coordinate value of a first input operation and a beginning coordinate value of a second input operation so that an absolute coordinate value mode inputting operation is enabled in a relative coordinate value mode,
wherein in said calculation unit, a coordinate value of the first input operation is set as the final coordinate value input of the first input operation,
wherein the distance calculated by said calculation unit is transmitted to a host apparatus so as to prevent the second input operation from being connected to the first input operation on a display,
wherein the absolute coordinate value mode inputting operation is enabled in the relative coordinate value mode based on a time during which input means is detached from the surface of said input unit.

34. A method of detecting coordinates, comprising:
inputting at least one coordinate value to a surface of an input unit using input means;
determining an operation mode of said inputting;
enabling an absolute coordinate value mode inputting operation in a relative coordinate value mode by setting a coordinate value of a first inputting as the final coordinate value input of the first inputting if a second inputting occurs within a predetermined time after the first inputting; and
calculating a distance between the set coordinate value of the first inputting and an initial coordinate value of the second inputting,
wherein the absolute coordinate value mode inputting operation is enabled in the relative coordinate value mode based on a time during which the input means is detached from the surface of said input unit, and
the distance calculated by said calculating is transmitted to a host apparatus so as to prevent the second inputting from being connected to the first inputting on a display.

35. A writing device, comprising:
an input unit, having a surface thereof, to which a coordinate value is input by input means;
a detection unit determining an operation mode of the input unit, the detection unit further comprising:
a calculation unit configured to calculate a distance between a final coordinate value of a previous operation and a beginning coordinate value of a current input operation by said input unit so that an absolute coordinate value mode inputting operation is enabled in a relative coordinate value mode, the current input operation occurring after a detachment of the input means from the surface of said input unit during the immediately preceding previous input operation,
wherein, in said calculation unit, a coordinate value at a time when the input means is detached is set from the surface of said input unit as the final coordinate value of the previous input operation,
wherein the distance calculated by said calculation unit is transmitted to a host apparatus so as to prevent the current input operation from being connected to the previous input operation on a display,
wherein the absolute coordinate value mode inputting operation is enabled in the relative coordinate value mode based on a time during which the input means is detached from the surface of said input unit.

36. A method of detecting coordinates of a writing character, comprising:
inputting a coordinate value of a writing character to a surface of an input unit, by input means;

determining an operation mode of the inputting;
calculating a distance between a final coordinate value of a previous input operation and a beginning coordinate value of a current input operation so that an absolute coordinate value mode inputting operation is enabled in a relative coordinate value mode, the current input operation occurring after a detachment of the input means from the surface of said input unit during the immediately preceding previous input operation; and
setting, in the calculating, a coordinate value input at a time when the input means is detached from the surface of the input unit as the final coordinate value of the previous input operation,
wherein the distance calculated by said calculating is transmitted to a host apparatus so as to prevent the current input operation from being connected to the previous input operation on a display, and
wherein the absolute coordinate value mode inputting operation is enabled in the relative coordinate value mode based on a time during which the input means is detached from the surface of said input unit.

37. A writing device, comprising:
an input unit, having a surface thereof, to which a coordinate value of a writing character is input;
a detection unit determining an operation mode of the input unit, the detection unit further comprising:
  a calculator configured to calculate a distance between a final coordinate value of a first input operation and a beginning coordinate value of a second input operation so that an absolute coordinate value mode inputting operation is enabled in a relative coordinate value mode,
wherein a coordinate value of the first input operation is set in the processor as the final coordinate value input of the first input operation, and
wherein the distance calculated by said calculator is transmitted to a host apparatus so as to prevent the second input operation from being connected to the first input operation on a display, and
wherein the absolute coordinate value mode inputting operation is enabled in the relative coordinate value mode based on a time during which the input means is detached from the surface of said input unit.

38. A method of detecting coordinates of a writing character, comprising:
inputting at least one coordinate value of the writing character to a surface of an input unit by input means;
determining an operation mode of inputting;
setting a coordinate value of a first inputting as the final coordinate value input of the first inputting if a second inputting has not occurred for a predetermined time; and
enabling an absolute coordinate value mode inputting operation in a relative coordinate value mode by calculating a distance between the set coordinate value of the first inputting and an initial coordinate value of the second inputting,
wherein the distance calculated by said calculating is transmitted to a host apparatus so as to prevent the second inputting from being connected to the first inputting on a display, and
wherein the absolute coordinate value mode inputting operation is enabled in the relative coordinate value mode based on a time during which the input means is detached from the surface of said input unit.

39. A computer-readable recording medium that stores a method of detecting coordinates comprising:
inputting a coordinate value to a surface of an input unit, by input means;
determining an operation mode of the inputting;
calculating a distance between a final coordinate value of a previous input operation and a beginning coordinate value of a current input operation so that an absolute coordinate value mode inputting operation is enabled in a relative coordinate value mode, the current input operation occurring after a detachment of the input means from the surface of said input unit during the immediately preceding previous input operation; and
setting, in the calculating, a coordinate value input at a time when the input means is detached from the surface of the input unit as the final coordinate value of the previous input operation,
wherein the distance calculated by said calculating is transmitted to a host apparatus so as to prevent the current input operation from being connected to the previous input operation on a display, and
wherein the absolute coordinate value mode inputting operation is enabled in the relative coordinate value mode based on a time during which the input means is detached from the surface of said input unit.

40. A computer-readable recording medium that stores a method of detecting coordinates comprising:
inputting at least one coordinate value to a surface of an input unit using input means;
enabling an absolute coordinate value mode inputting operation in a relative coordinate value mode by setting a coordinate value of a first inputting as the final coordinate value input of the first inputting if a second inputting occurs within a predetermined time after the first inputting; and
calculating a distance between the set coordinate value of the first inputting and an initial coordinate value of the second inputting,
wherein the absolute coordinate value mode inputting operation is enabled in the relative coordinate value mode based on a time during which the input means is detached from the surface of said input unit, and
the distance calculated by said calculating is transmitted to a host apparatus so as to prevent the second inputting from being connected to the first inputting on a display.

* * * * *